US011295581B2

(12) United States Patent
Fujimoto et al.

(10) Patent No.: US 11,295,581 B2
(45) Date of Patent: Apr. 5, 2022

(54) INFORMATION PROCESSING DEVICE AND FOREIGN MATTER DETECTION METHOD

(71) Applicant: NIDEC SANKYO CORPORATION, Nagano (JP)

(72) Inventors: Masaya Fujimoto, Nagano (JP); Junro Takeuchi, Nagano (JP); Kohei Okui, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/663,442

(22) Filed: Oct. 25, 2019

(65) Prior Publication Data

US 2020/0134985 A1 Apr. 30, 2020

(30) Foreign Application Priority Data

Oct. 26, 2018 (JP) .............................. JP2018-202161

(51) Int. Cl.
*G07F 19/00* (2006.01)
*G06K 7/00* (2006.01)
*G06K 7/08* (2006.01)
*G07F 7/08* (2006.01)

(52) U.S. Cl.
CPC ....... *G07F 19/2055* (2013.01); *G06K 7/0004* (2013.01); *G06K 7/084* (2013.01); *G06K 7/087* (2013.01); *G07F 7/0873* (2013.01)

(58) Field of Classification Search
CPC .............. G07F 7/0873; G07F 19/2055; G06Q 20/1085; G06K 7/08

USPC ............ 235/379, 449, 435; 705/43; 340/5.3, 340/5.41
See application file for complete search history.

(56) References Cited

U.S. PATENT DOCUMENTS

| | | | | |
|---|---|---|---|---|
| 2006/0169764 | A1* | 8/2006 | Ross ..................... | G07F 19/207 235/375 |
| 2014/0372305 | A1* | 12/2014 | Ray ..................... | G07F 19/2055 705/44 |
| 2015/0091547 | A1* | 4/2015 | Vasilev ................. | H04K 3/822 324/76.45 |
| 2015/0213427 | A1* | 7/2015 | Hodges ............... | G07F 19/2055 705/18 |
| 2015/0213428 | A1* | 7/2015 | Hodges ................. | H04K 3/822 705/18 |
| 2018/0261051 | A1* | 9/2018 | Ooi ..................... | G07F 19/2055 |
| 2018/0286211 | A1* | 10/2018 | Yap ..................... | G06Q 20/1085 |

FOREIGN PATENT DOCUMENTS

JP 2016018380 A 2/2016
JP 2017219971 A 12/2017

* cited by examiner

*Primary Examiner* — Suezu Ellis
(74) *Attorney, Agent, or Firm* — Cantor Colburn LLP

(57) ABSTRACT

An information processing device structured to process information of an information recording medium having been inserted inside may include a communication part which receives a radio wave of a specific frequency band, and a foreign matter detection part structured to detect that a foreign matter has been attached in response to an intensity of the radio wave received by the communication part being greater than or equal to a threshold value for a predetermined time.

7 Claims, 9 Drawing Sheets

INFORMATION PROCESSING DEVICE AND FOREIGN MATTER DETECTION METHOD

CROSS REFERENCE TO RELATED APPLICATION

The present invention claims priority under 35 U.S.C. § 119 to Japanese Application No. 2018-202161 filed Oct. 26, 2018, the entire content of which is incorporated herein by reference.

TECHNICAL FIELD

At least an embodiment of the present invention may relate to an information processing device structured to perform reading of information recorded in an information recording medium such as a card and/or recording of information to an information reading device. Further, at least an embodiment of the present invention may relate to a foreign matter detection method in the information processing device.

BACKGROUND

An information processing device such as a card reader structured to perform reading of magnetic data recorded in a card and/or recording of magnetic data to a card has been widely utilized. In an industry such as a financial institution where a card reader is utilized, a so-called skimming has become a serious problem in which a skimming device including a magnetic head is attached to a card insertion part of a card reader to illegally acquire magnetic data of a card by the magnetic head. Tricks of skimming by a criminal have been diversified and crafted every year, and a situation has also occurred that a card-shaped skimming device including a skimming magnetic head for reading magnetic data of a card is attached inside the card reader.

In Japanese Patent Laid-Open No. 2017-219971 (Patent Literature 1), a technique is disclosed in which insertion of a skimming device to an inside of a card reader is detected. In Japanese Patent Laid-Open No. 2016-18380 (Patent Literature 2), a technique is disclosed in which a disturbing magnetic field is generated to prevent illegal reading of information by a skimming device attached to the outside.

It is advantageous for preventing a crime that a technique for detecting attachment of a skimming device is provided by combining a plurality of techniques, not limited to the technique described in Patent Literature 1. For example, as a skimming device, it is conceivable to provide with a function in which information is illegally read from a card and is recorded inside, and the information is transmitted to an external equipment by using short-range wireless communication. Therefore, crime prevention performance is required to enhance for a skimming device having such a function.

SUMMARY

In view of the problem described above, at least an embodiment of the present invention may advantageously provide an information processing device and a foreign matter detection method in the information processing device which are capable of detecting that a foreign matter such as a skimming device having a wireless communication function has been attached to the information processing device.

According to at least an embodiment of the present invention, there may be provided an information processing device structured to process information of an information recording medium having been inserted inside, and the information processing device includes a communication part which receives a radio wave of a specific frequency band, and a foreign matter detection part structured to detect that a foreign matter has been attached when a state that an intensity of the radio wave received by the communication part is not less than a threshold value continues for a predetermined time.

According to at least an embodiment of the present invention, there may be provided a foreign matter detection method in an information processing device structured to process information of an information recording medium having been inserted inside, and the foreign matter detection method includes receiving a radio wave of a specific frequency band and, when a state that an intensity of the radio wave is not less than a threshold value continues for a predetermined time, detecting that a foreign matter other than the information recording medium has been attached to the information processing device.

Effects of the Invention

According to at least an embodiment of the present invention, an information processing device and a foreign matter detection method in an information processing device are provided which are capable of detecting that a foreign matter such as a skimming device having a wireless communication function has been attached to the information processing device.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Structure of Card Reader)

Figure 1:
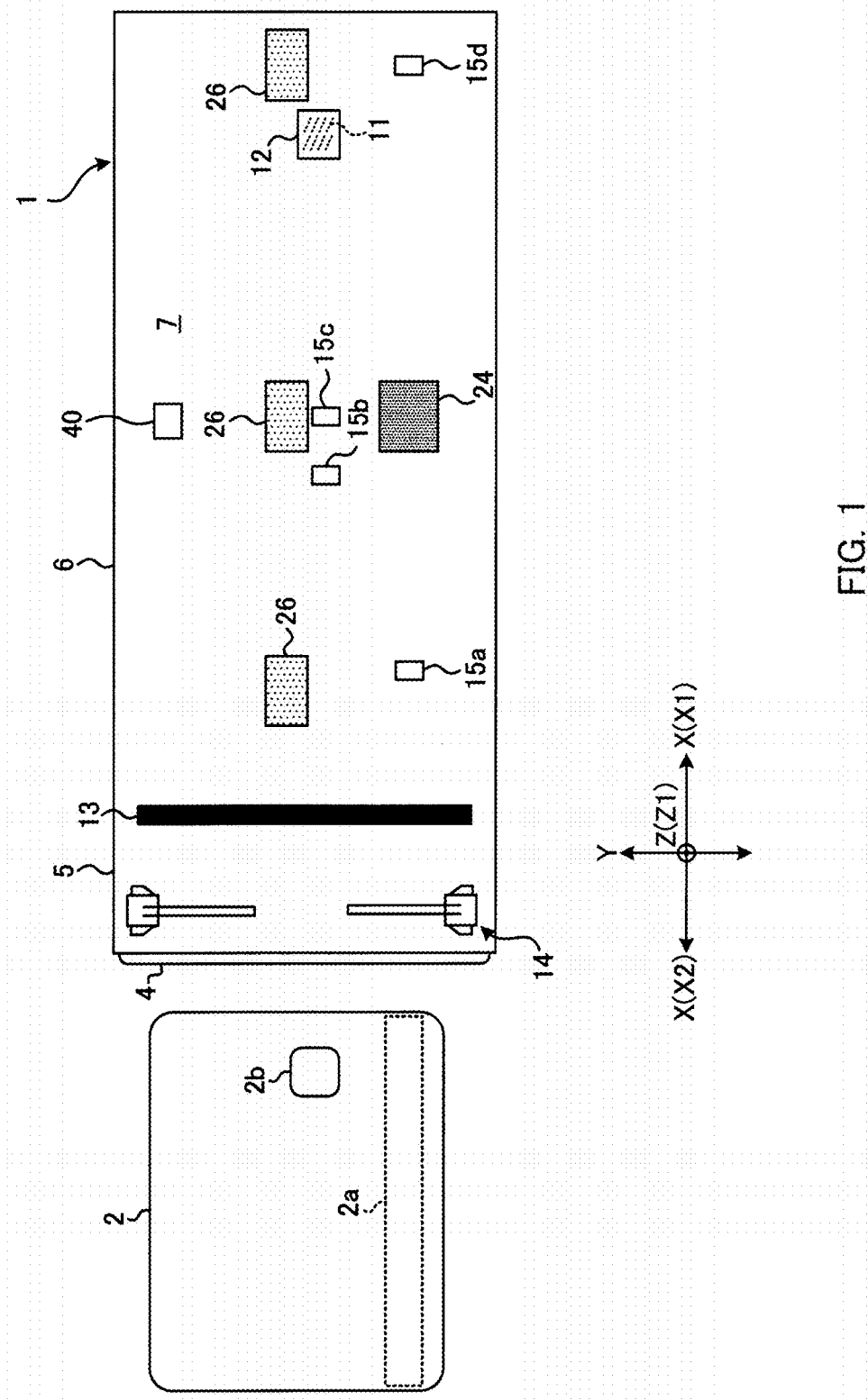
FIG. 1 is an explanatory plan view showing a structure of a card reader 1 as an information processing device in accordance with at least an embodiment of the present invention.
Figure 2:
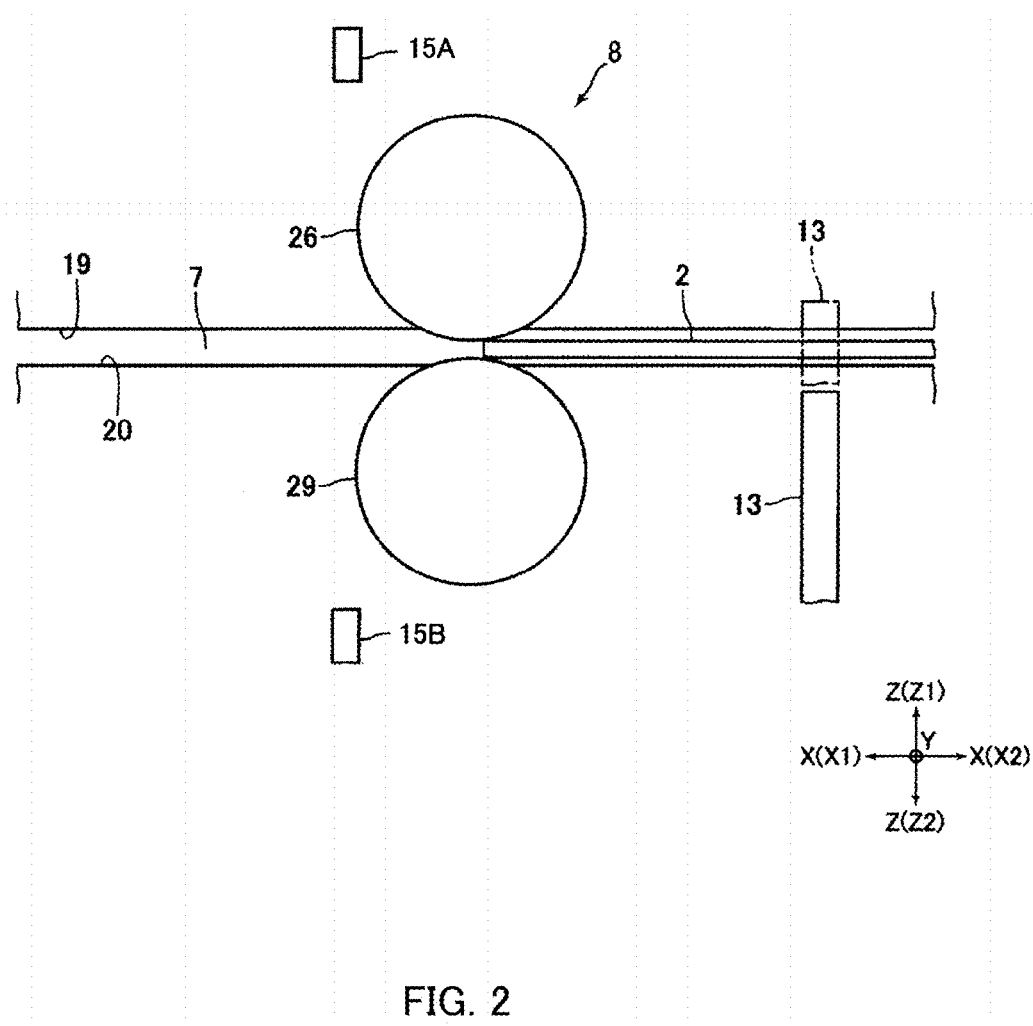
FIG. 2 is an explanatory side view showing a structure of a card detection mechanism 15a and a conveyance roller 26 shown in FIG. 1.
Figure 3:
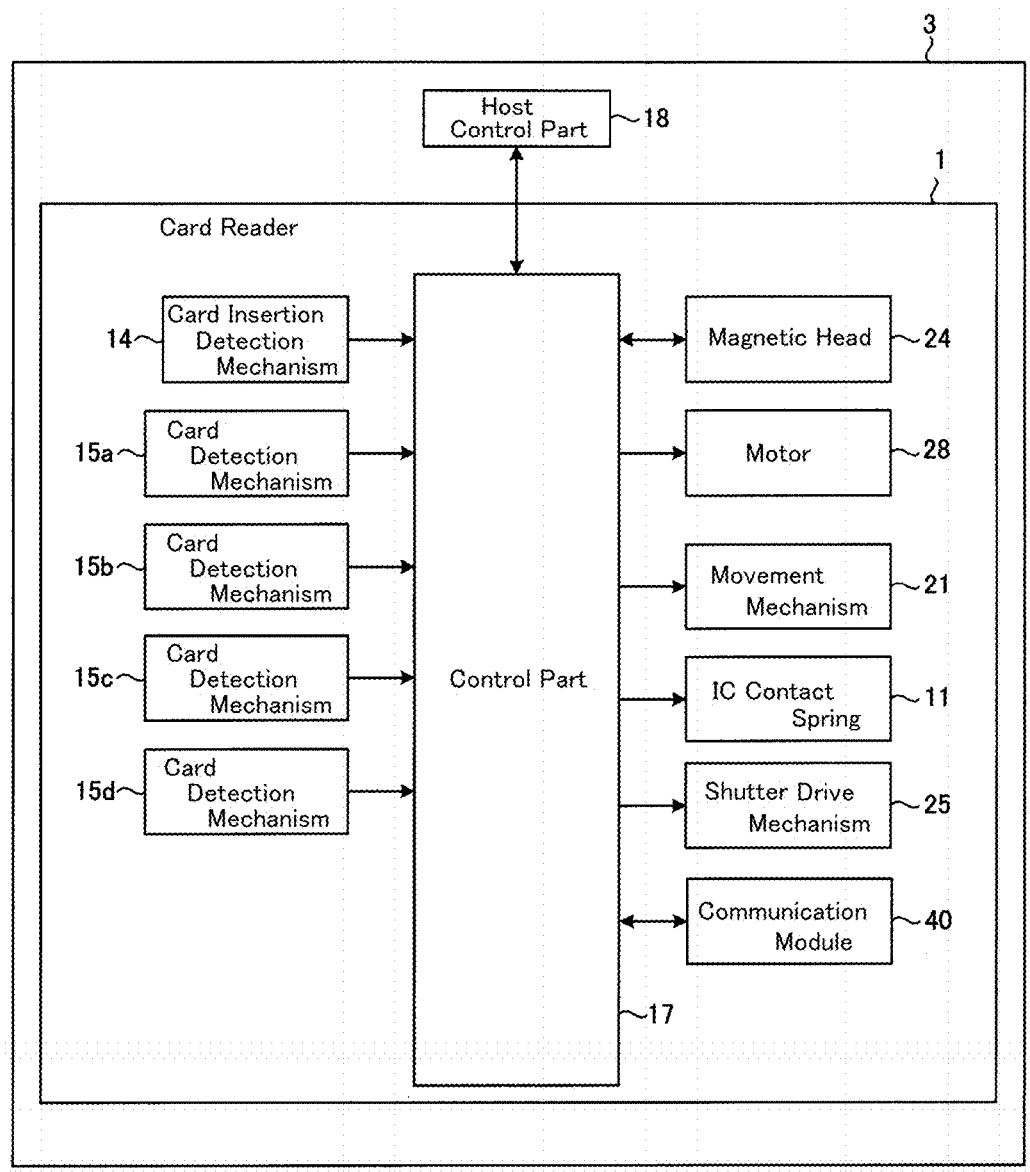
FIG. 3 is a block diagram showing a host apparatus 3 on which the card reader 1 shown in FIG. 1 is mounted and the card reader 1.

FIG. 1 is an explanatory plan view showing a structure of a card reader 1 as an information processing device in accordance with at least an embodiment of the present invention. FIG. 2 is an explanatory side view showing a structure of a card detection mechanism 15a and a conveyance roller 26 shown in FIG. 1. FIG. 3 is a block diagram showing a host apparatus 3 on which the card reader 1 shown in FIG. 1 is mounted and the card reader 1.

A card reader 1 is a device which is structured to perform reading of information recorded in a card 2 as an information recording medium and/or recording of information to a card 2 and is mounted and used in a host apparatus 3 (see FIG. 3) such as an ATM (Automated Teller Machine). As shown in FIG. 1, the card reader 1 includes a card insertion part 5 formed with an insertion port 4 into which a card 2 is inserted and a main body part 6. An inside of the main body part 6 of the card reader 1 is formed with a card conveyance passage 7 where a card 2 inserted through the insertion port 4 is conveyed, and the card reader 1 includes a card conveyance mechanism 8 (see FIG. 2) structured to convey the card 2 along the card conveyance passage 7.

In the card reader 1, a card 2 is conveyed in the "X" direction shown in FIG. 1 and the like. Further, a card 2 is inserted in the "X1" direction in FIG. 1 and the like and is ejected in the "X2" direction. In other words, the "X1" direction is an inserting direction of a card 2 to the insertion port 4, and the "X2" direction is an ejecting direction of the card 2 from the insertion port 4. Further, the "Z" direction shown in FIG. 1 and the like which is perpendicular to the "X" direction is a thickness direction of a card 2 having been inserted into the insertion port 4, and the "Y" direction shown in FIG. 1 and the like which is perpendicular to the "X" direction and the "Z" direction is a width direction of the card 2. In the following descriptions, the "X" direction is defined as a front and rear direction, the "Y" direction is defined as a right and left direction, and the "Z" direction is defined as an upper and lower direction. Further, in the front and rear direction, a side ("X2" direction side) where the insertion port 4 is formed is referred to as a "front" side, and the opposite side ("X1" direction side) is referred to as a "rear (back)" side. Further, in the upper and lower direction, one side ("Z1" direction side) is referred to as an "upper" side, and the opposite side ("Z2" direction side) is referred to as a "lower" side.

A card 2 is, for example, a rectangular card made of vinyl chloride whose thickness is about 0.7-0.8 mm. Further, a card 2 is a contact type IC card with a magnetic stripe conforming to the international standard (ISO/IEC7811) or the JIS standard (JISX6302). As shown in FIG. 1, a rear face (under face) of a card 2 is formed with a magnetic stripe 2a in which magnetic data are recorded. Further, an IC chip is incorporated into the card 2, and a front face (upper face) of the card 2 is formed with an outside connection terminal 2b of the IC chip. The magnetic stripe 2a and the outside connection terminal 2b are formed at predetermined positions prescribed by the international standard or the JIS standard.

The card reader 1 includes a magnetic head 24 (see FIG. 1), which is structured to perform at least one of reading of magnetic data recorded in the magnetic stripe 2a and recording of magnetic data to the magnetic stripe 2a, and an IC contact block 12 having a plurality of IC contact springs 11 structured to contact with the outside connection terminal 2b of the card 2 in the inside of the main body part 6.

Further, the card reader 1 includes a shutter member 13 structured to close the card conveyance passage 7, a card insertion detection mechanism 14 structured to detect a card 2 having been inserted into the insertion port 4, card detection mechanisms 15a, 15b, 15c and 15d structured to detect presence or absence of a card 2 in the card conveyance passage 7, and a control part 17 structured to control the card reader 1. The control part 17 is connected with a host control part 18 which is a control part of the host apparatus 3 (see FIG. 3).

The card insertion part 5 is connected with a front end of the main body part 6. The card conveyance passage 7 includes, as shown in FIG. 2, an upper guide member 19 structuring an upper face of the card conveyance passage 7 and a lower guide member 20 structuring a lower face of the card conveyance passage 7. The upper guide member 19 and the lower guide member 20 is formed of resin material or the like having an insulation property or conductivity. As shown in FIG. 1, the magnetic head 24 and the IC contact block 12 are disposed in the inside of the main body part 6. The magnetic head 24 is disposed so that a gap part of the magnetic head 24 faces the card conveyance passage 7 from a lower side. The IC contact block 12 is disposed on a rear side with respect to the magnetic head 24. Further, the IC contact block 12 is disposed so as to face the card conveyance passage 7 from an upper side. The magnetic head 24 is electrically connected with the control part 17 (see FIG. 3).

The IC contact block 12 is connected with a movement mechanism 21 (see FIG. 3) structured to move the IC contact block 12 between a contactable position where the IC contact springs 11 are capable of contacting with an outside connection terminal 2b of a card 2 and a retreated position where the IC contact springs 11 are retreated so as not to contact with the outside connection terminal 2b of the card 2 (specifically, retreated to an upper side). The movement mechanism 21 is connected with the control part 17. The IC contact springs 11 are electrically connected with the control part 17. The control part 17 supplies an electric current to the IC contact springs 11.

The card insertion detection mechanism 14 is disposed on the rear side with respect to the insertion port 4 and detects a card 2 which is inserted into the insertion port 4. The card insertion detection mechanism 14 is a width detection mechanism structured to detect a width of a card 2 (width in the right and left direction) inserted into the insertion port 4 and thereby detect the card 2 having been inserted into the insertion port 4. The card insertion detection mechanism 14 is electrically connected with the control part 17.

The shutter member 13 is disposed in a boundary portion between the card insertion part 5 and the main body part 6, in other words, in a rear end side portion of the card insertion part 5. The shutter member 13 is connected with the shutter drive mechanism 25 (see FIG. 3). The shutter drive mechanism 25 is connected with the control part 17. The shutter member 13 is movable between a closing position (position shown by the two-dot chain line in FIG. 2) where the card conveyance passage 7 is closed and an open position (position shown by the solid line in FIG. 2) where the shutter member 13 is retreated from the card conveyance passage 7 to open the card conveyance passage 7.

The card detection mechanisms 15a, 15b, 15c and 15d are disposed in the inside of the main body part 6. The card detection mechanisms 15a, 15b, 15c and 15d are respectively disposed in a shifted state in the front and rear direction. The card detection mechanism 15b is disposed on the rear side with respect to the card detection mechanism 15a, the card detection mechanism 15c is disposed on the rear side with respect to the card detection mechanism 15b, and the card detection mechanism 15d is disposed on the rear side with respect to the card detection mechanism 15c. As shown in FIG. 3, the card detection mechanisms 15a, 15b, 15c and 15d are electrically connected with the control part 17. Further, as shown in FIG. 2, each of the card detection mechanisms 15a, 15b, 15c and 15d is a transmission type optical sensor having a light emitting part 15A and a light receiving part 15B which are disposed so as to face each other. In FIG. 2, the card detection mechanisms 15b, 15c and 15d are not shown. As shown in FIG. 2, the light emitting part 15A and the light receiving part 15B are disposed in a state that the card conveyance passage 7 is interposed therebetween in the upper and lower direction.

When no card 2 is existed between the light emitting part 15A and the light receiving part 15B, the light receiving part 15B receives a light from the light emitting part 15A. In this case, the card detection mechanisms 15a, 15b, 15c and 15d are set in an OFF state. In this state, when a card 2 is inserted between the light emitting part 15A and the light receiving part 15B, the light going to the light receiving part 15B from the light emitting part 15A is blocked, and the card detection mechanisms 15a, 15b, 15c and 15d are set in an "ON" state. As described above, the card detection mechanisms 15a, 15b, 15c and 15d detect a card 2 by turning from an OFF state to an ON state.

As shown in FIG. 2, the card conveyance mechanism 8 includes three conveyance rollers 26 (see FIG. 1, one disposed on the most front side is shown in FIG. 2) structured to contact with a card 2 and convey the card 2 along the card conveyance passage 7, a motor 28 (see FIG. 3) structured to drive the respective conveyance rollers 26, and a power transmission mechanism (not shown) structured to transmit power of the motor 28 to the respective conveyance rollers 26. The respective conveyance rollers 26 are disposed in the inside of the main body part 6. In other words, the conveyance rollers 26 are disposed on the rear side with respect to the card insertion detection mechanism 14.

As shown in FIG. 2, a pad roller 29 is disposed for the conveyance rollers 26 so as to face each conveyance roller 26. Each conveyance roller 26 and each pad roller 29 are faced each other in the upper and lower direction. Further, the pad roller 29 is urged toward the conveyance roller 26, and a card 2 is conveyed in a state sandwiched between the conveyance roller 26 and the pad roller 29.

As shown in FIG. 1, the main body part 6 is provided with a communication module 40 for performing wireless communication by utilizing a radio wave of a specific frequency band (for example, 2.4 GHz band). In this embodiment, the communication module 40 is configured so as to perform communication conforming to a standard (for example, Bluetooth (registered trademark)) for performing one-to-one wireless communication (communication in which an apparatus capable of simultaneously performing communication is restricted to only one apparatus). The communication module 40 is connected with the control part 17. The communication module 40 structures a communications part.

(Conceivable Structural Example of Skimming Device)

Figure 4:
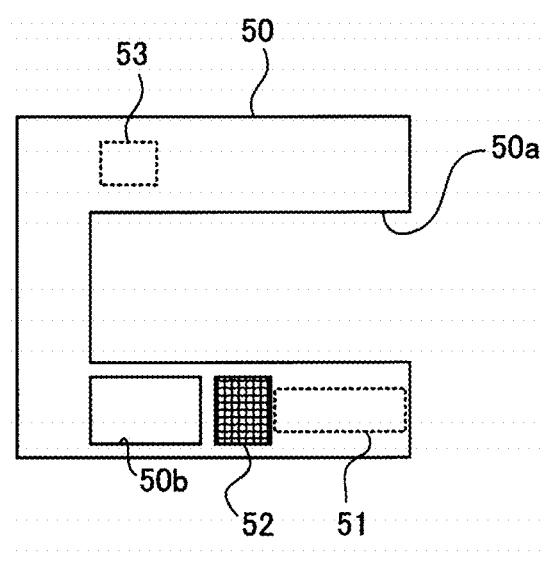
FIG. 4 is a view showing a conceivable structural example of a skimming device which is to be inserted into an inside of the card reader 1.
Figure 5:
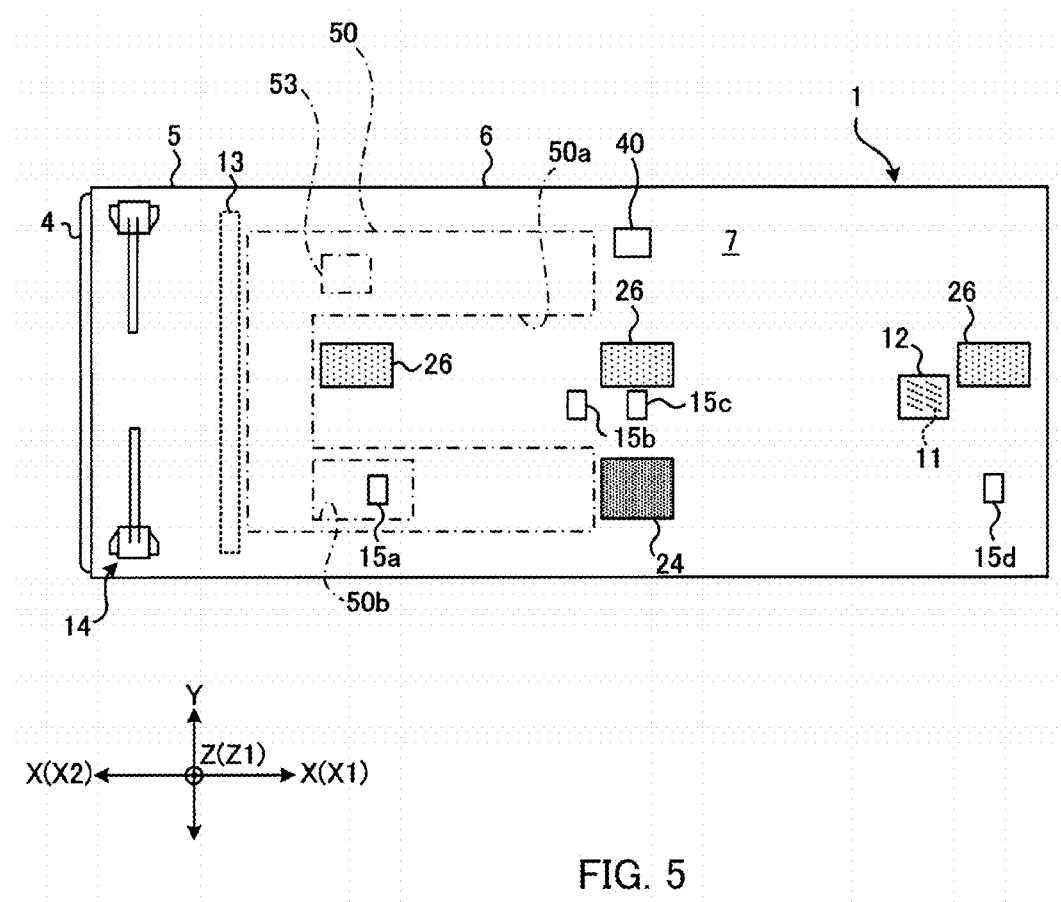
FIG. 5 is a plan view showing a state that a skimming device 50 shown in FIG. 4 has been inserted into a main body part 6 of the card reader 1.

FIG. 4 is a view showing a conceivable structural example of a skimming device which is to be inserted into the inside of the card reader 1. FIG. 5 is a plan view showing a state that the skimming device 50 shown in FIG. 4 has been inserted into the main body part 6 of the card reader 1.

A skimming device 50 shown in FIG. 4 is provided with a main body part in a rectangular plate shape whose width in the right and left direction is substantially the same as a width of a card 2. The main body part of the skimming device 50 shown in FIG. 4 is formed with a cut-out part 50a for avoiding contact with the conveyance roller 26 located at the most front side in the inside of the main body part 6 of the card reader 1. Further, the main body part of the skimming device 50 shown in FIG. 4 is formed with a through-hole 50b so that, when the skimming device 50 has been attached to the main body part 6 of the card reader 1, light going from the light emitting part 15A to the light receiving part 15B of the card detection mechanism 15a is not blocked. The skimming device 50 shown in FIG. 4 is inserted into the main body part 6 by pushing it by hand through the insertion port 4.

An end part (tip end) on the rear side in the front and rear direction of the main body part of the skimming device 50 shown in FIG. 4 is formed with a forged magnetic stripe 51, and a magnetic head 52 for reading magnetic information from a magnetic stripe of a regular card 2 is formed on a left side adjacent to the magnetic stripe 51. The magnetic stripe 51 is recorded with the same information as the information recorded in a tip end of a magnetic stripe 2a of a regular card 2.

The main body part of the skimming device 50 shown in FIG. 4 further includes a communication module 53 configured to perform wireless communication. The communication module 53 is configured so that information read from a regular card 2 by the magnetic head 52 is capable of being transmitted to an external equipment through the communication module 53. In this embodiment, the communication module 53 is configured so as to perform communication conforming to the communication standard (for example, Bluetooth (registered trademark)) which is the same as the communication module 40 in the card reader 1.

The control part 17 of the card reader 1 shown in FIG. 3 integrally controls the entire card reader 1, and specifically, the control part 17 includes various processors where programs are executed to perform processing, a RAM (Random Access Memory) and a ROM (Read Only Memory). The various processors include a CPU (Central Processing Unit) which is a general-purpose processor executing a program to perform various processes, a programmable logic device (PLD) which is a processor such as an FPGA (Field Programmable Gate Array) whose circuit structure is capable of being changed after manufactured, a dedicated electric circuit which is a processor having a circuit configuration exclusively designed for executing a specific process such as ASIC (Application Specific Integrated Circuit), or the like. More specifically, the configurations of the various processors are electric circuits obtained by combining circuit elements such as semiconductor elements.

When a regular card 2 is inserted into the insertion port 4 and the insertion of the card 2 is detected by the card insertion detection mechanism 14, the control part 17 moves the shutter member 13 from the closing position to the open position. As a result, the card reader 1 is set in a state that the card 2 is capable of being taken into the inside of the main body part 6.

Further, also in a case that a skimming device 50 having a magnetic stripe 51 shown in FIG. 4 is inserted into the insertion port 4 and the insertion of the skimming device 50 is detected by the card insertion detection mechanism 14, the control part 17 moves the shutter member 13 from the closing position to the open position. As a result, as shown in FIG. 5, the card reader 1 is set in a state that the skimming device 50 is capable of being inserted into the inside of the main body part 6.

(Function of Control Part)

Figure 6:
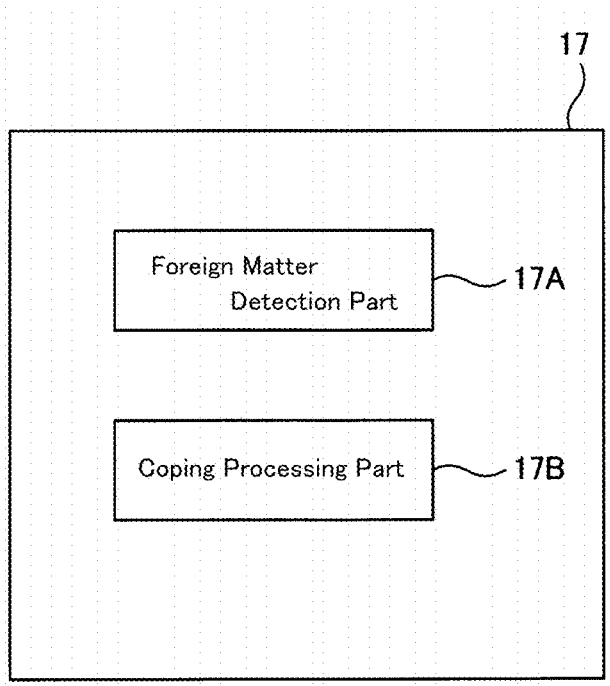
FIG. 6 is a functional block diagram showing a control part 17 shown in FIG. 3.

FIG. 6 is a functional block diagram showing the control part 17 shown in FIG. 3. The control part 17 executes a program so that the control part 17 functions as a foreign matter detection part 17A and a coping processing part 17B.

The foreign matter detection part 17A monitors a radio wave received by the communication module 40. The foreign matter detection part 17A detects that a foreign matter other than a card 2, specifically, a skimming device has been attached to the main body part 6 in a case that a state that an intensity of a radio wave received by the communication module 40 is not less than a predetermined threshold value "Th" continues for a predetermined time "T".

As shown in FIG. 5, in a state that a skimming device 50 has been inserted, a distance between the communication module 53 and the communication module 40 of the main body part 6 is small and thus, an intensity of a radio wave which is sent from the communication module 53 and is received by the communication module 40 becomes high. Further, as shown in FIG. 5, in a state that the skimming device 50 has been inserted, unless the skimming device 50 is taken out, a state is continued that the intensity of the radio wave received by the communication module 40 is high.

On the other hand, a user who utilizes the host apparatus 3 including the card reader 1 may possess an apparatus including a communication module of the same standard as the communication module 40. Also in such a case, a distance between the communication module of the apparatus possessed by the user and the communication module 40 of the main body part 6 becomes small. Therefore, an intensity of a radio wave which is sent from the communication module of the apparatus possessed by the user and is received by the communication module 40 is high. However, the user will leave from the card reader 1 after utilization of the host apparatus 3 is finished. Therefore, a state that a distance between the communication module of the apparatus possessed by the user and the communication module 40 of the main body part 6 is small does not continue until exceeding a time period that the user is utilizing the host apparatus 3. Accordingly, when the threshold value "Th" is set to be a sufficiently large value and the time "T" is set to be a maximum time (for example, 10 minutes, 30 minutes or one hour) which is assumed that a user utilizes the host apparatus 3, the skimming device 50 can be detected by the foreign matter detection part 17A.

The coping processing part 17B performs at least one of notification processing to an external device and reception stop processing of a card 2 when detected by the foreign matter detection part 17A that a foreign matter has been attached to the main body part 6. Specifically, the reception stop processing of a card 2 is processing in which the shutter member 13 is forcibly moved to the closing position. The notification processing to an external device is, for example, processing in which information indicating insertion of a skimming device is transmitted to the host control part 18 of the host apparatus 3.

(Details of Foreign Matter Detection Processing)

Figure 7:
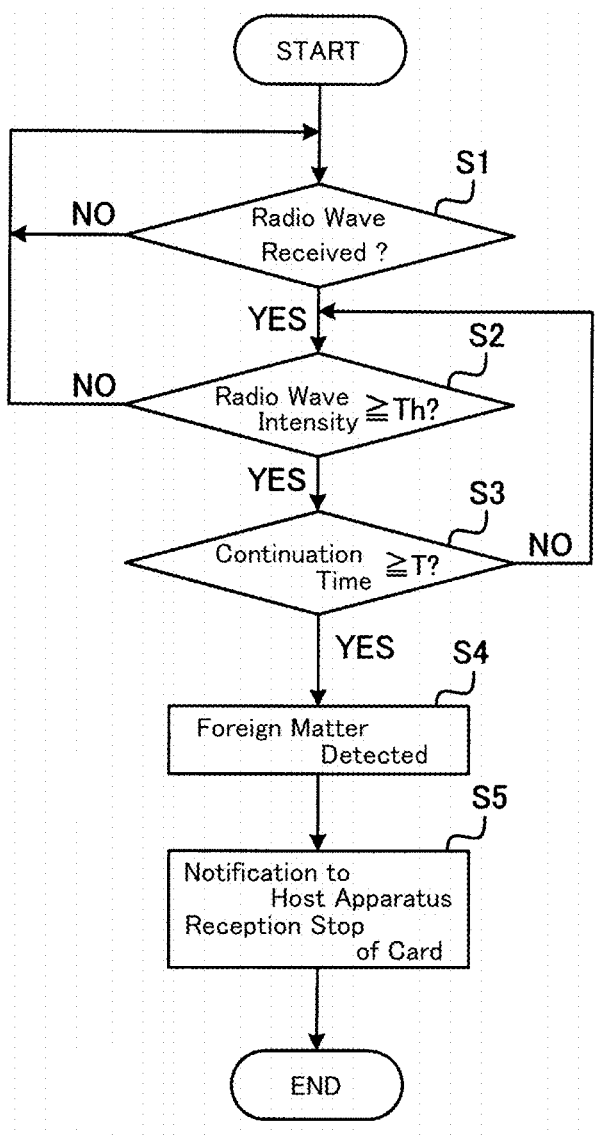
FIG. 7 is a flow chart for explaining a foreign matter detection operation of the control part 17.

FIG. 7 is a flow chart for explaining a foreign matter detection operation of the control part 17. When the card reader 1 starts up, the foreign matter detection part 17A determines whether a radio wave is received by the communication module 40 or not (step S1). When a radio wave is not received (step S1: NO), the processing of the step S1 is repeated.

When the foreign matter detection part 17A receives a radio wave (step S1: YES), it is determined whether a reception intensity of the radio wave is not less than the threshold value "Th" or not (step S2). In a case that the reception intensity is less than the threshold value "Th", (for example, only in a case that an apparatus including a communication module which performs communication with the same standard as the communication module 40 is located in a somewhat separated place from the card reader 1), the foreign matter detection part 17A returns the processing to the step S1.

When the reception intensity is not less than the threshold value "Th" (for example, in a state that a person possessing an apparatus including a communication module which communicates with the same standard as the communication module 40 is utilizing the card reader 1 or, in a state that the skimming device 50 has been inserted into the main body part 6, the foreign matter detection part 17A increases a count value (unit: second) of a counting timer by one (1). The count value is set to be zero in an initial state. Then the foreign matter detection part 17A determines whether a count value of the counting timer has reached to the time "T" or not (step S3).

When the count value of the counting timer is less than the time "T" (step S3: NO), the foreign matter detection part 17A returns the processing to the step S2. In this embodiment, in a case that the determination of the step S2 becomes "NO" after the processing of the step S3, the count value of the counting timer is reset to zero at that point.

When the count value of the counting timer has reached the time "T" (step S3: YES), in other words, when a state that the intensity of the radio wave received by the communication module 40 is not less than the threshold value "Th" has continued for the time "T", the foreign matter detection part 17A determines that a skimming device 50 which is a foreign matter has been attached to the card reader 1 and, in this manner, attachment of the skimming device 50 is detected (step S4).

After that, the coping processing part 17B notifies the host apparatus 3 of the skimming device 50 having been attached and, in addition, performs reception stop processing of a card 2 (step S5), and the process is ended. In this case, in the step S5, only notification to the host apparatus 3 or only reception stop processing of a card 2 may be performed.

(Effects of Card Reader in this Embodiment)

As described above, the card reader 1 detects attachment of a foreign matter based on an intensity of a radio wave and a duration time of a state that the intensity is not less than the threshold value "Th". Therefore, a skimming device 50 having a wireless communication function can be detected with a high probability. As a result, security performance can be enhanced. Further, in addition to an intensity of a radio wave, a duration time of a state that the intensity is not less than the threshold value "Th" is utilized for detection of a foreign matter and thus, even when a user possessing an apparatus having a wireless communication function is utilizing the card reader 1, detection of the foreign matter can be performed with a high degree of accuracy.

(First Modified Embodiment of Card Reader)

Figure 8:
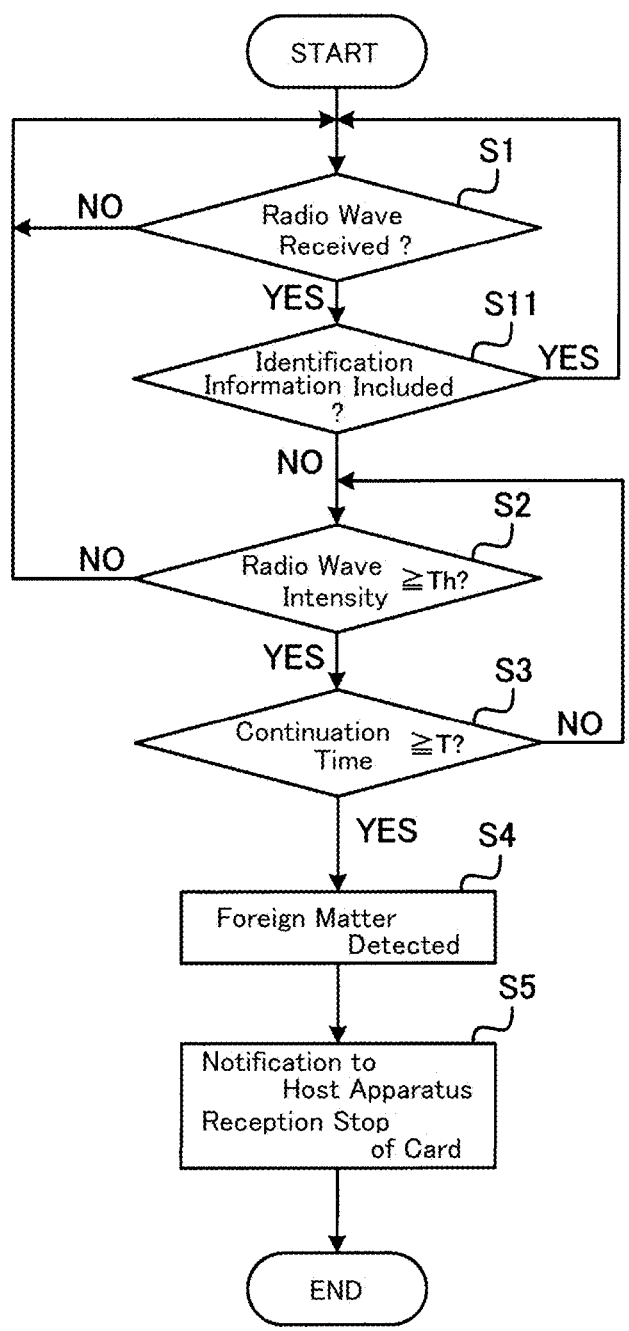
FIG. 8 is a flow chart for explaining a modified embodiment of a foreign matter detection operation of the control part 17.

FIG. 8 is a flow chart for explaining a modified embodiment of the foreign matter detection operation of the control part 17. A flow chart shown in FIG. 8 is the same as that in FIG. 7 except that a step S11 is added between the step S1 and the step S2. In FIG. 8, the same reference signs are used in the same processing as that in FIG. 7 and their descriptions are omitted.

When the determination of the step S1 becomes "YES", the foreign matter detection part 17A acquires information included in the radio wave received by the communication module 40 and determines whether the information includes identification information of an apparatus of a transmission source of the radio wave or not (step S11).

The identification information of an apparatus is information such as a category (smart phone, game machine, tablet or the like) of the apparatus or its model name. In a case that the radio wave received by the communication module 40 is sent from a communication module of Bluetooth (registered trademark) and, when the apparatus mounting this communication module is an apparatus other than a skimming device, an identification information such as a category of the apparatus or its model name should be included in the radio wave. On the other hand, the radio wave received by the communication module 40 is sent from a communication module of Bluetooth (registered trademark) and, when the apparatus mounting this communication module is a skimming device, there is high possibility that identification information is not included in the radio wave.

Therefore, in a case that identification information is included in the information of the received radio wave (step S11: YES), the foreign matter detection part 17A determines that the transmission source of the radio wave which is received by the communication module 40 is not a skimming device but an apparatus possessed by a user, and the processing is returned to the step S1.

On the other hand, in a case that identification information is not included in the information of the received radio wave (step S11: NO), the foreign matter detection part 17A determines that there is high possibility that the transmission source of the radio wave received by the communication module 40 is a skimming device, and the processing is advanced to the step S2.

(Effects of Card Reader in First Modified Embodiment)

As described above, processing of the step S2 and subsequent steps is performed only when identification information is not included in the information of the radio wave received by the communication module 40 and thus, a processing load of the control part 17 is reduced.

In accordance with at least an embodiment of the present invention, in the above-mentioned card reader 1 and the card reader 1 in the first modified embodiment, a module other than performing one-to-one wireless communication, in other words, a module which is capable of performing one-to-plural number wireless communication may be adopted as the communication module 40.

(Second Modified Embodiment of Card Reader)

Figure 9:
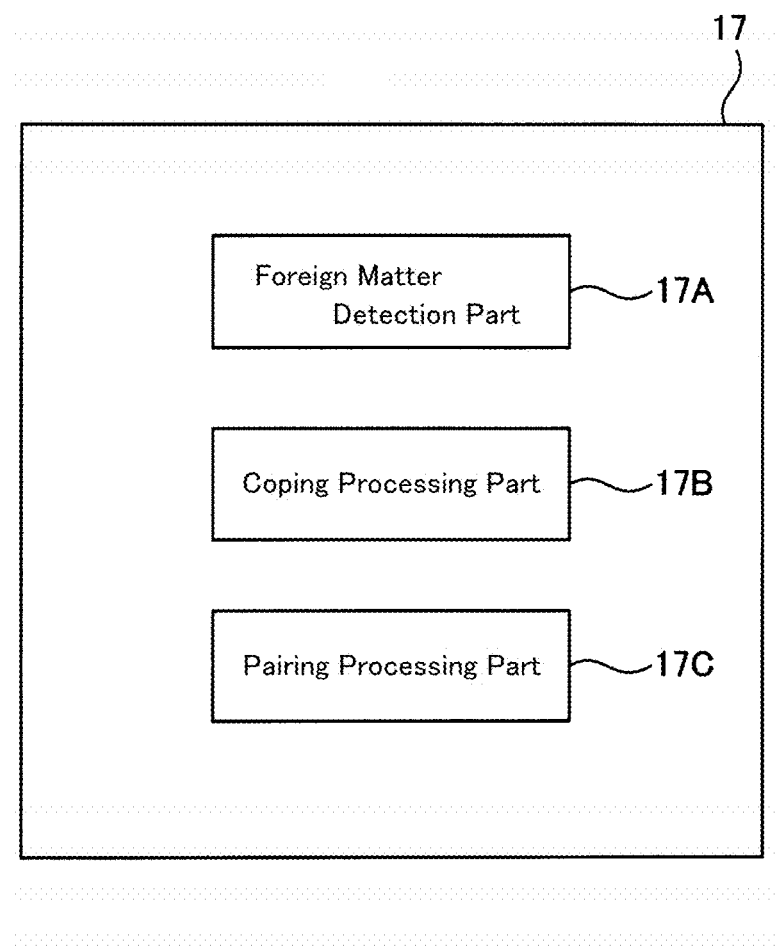
FIG. 9 is a view showing a modified embodiment of a functional block of the control part 17 of the card reader 1 shown in FIG. 1.

FIG. 9 is a view showing a second modified embodiment of a functional block of the control part 17 of the card reader 1 shown in FIG. 1. A function of the control part 17 is the same as that in FIG. 6 except that a pairing processing part 17C is added.

When it is detected by the foreign matter detection part 17A that a foreign matter (skimming device 50) has been attached, the pairing processing part 17C performs pairing processing with a transmission source of the radio wave received by the communication module 40 through the communication module 40.

Figure 10:
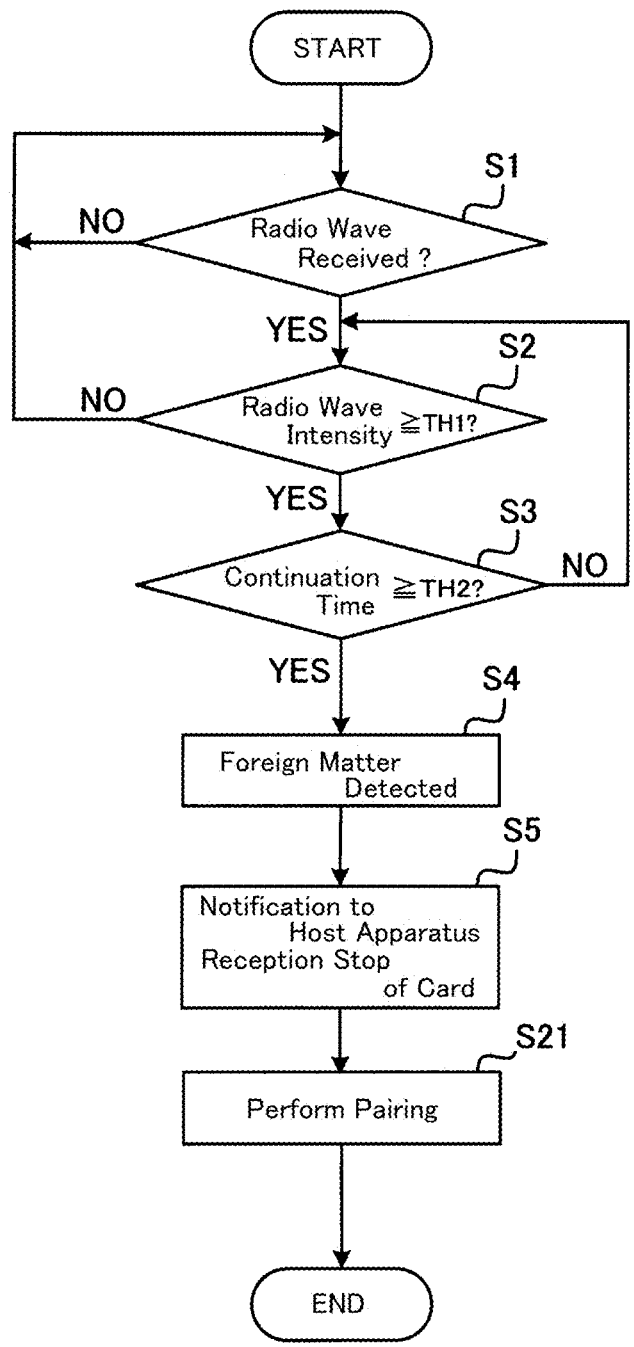
FIG. 10 is a flow chart for explaining a foreign matter detection operation of the control part 17 shown in FIG. 9.

FIG. 10 is a flow chart for explaining a foreign matter detection operation of the control part 17 shown in FIG. 9. The flow chart shown in FIG. 10 is the same as that in FIG. 7 except that a step S21 is added after the step S5. In FIG. 10, the same reference signs are used in the same processing as that in FIG. 7 and their descriptions are omitted.

After the step S5, the pairing processing part 17C performs pairing processing (step S21) with the transmission source (for example, a communication module 53 of a skimming device 50) of the radio wave received in the step S1. In a state that a person who has attached the skimming device 50 to the card reader 1 is not near the card reader 1 and connection between the communication module 53 of the skimming device 50 and another apparatus is not established, pairing can be performed between the communication module 53 of the skimming device 50 and the communication module 40 of the card reader 1 by processing of the step S21.

(Effects of Card Reader in Second Modified Embodiment)

As described above, when pairing is performed between the communication module 53 of the skimming device 50 and the communication module 40 of the card reader 1, another apparatus is unable to be connected with the communication module 53 of the skimming device 50. Therefore, even when information is illegally read from the card 2 and stored in a memory of the skimming device 50, the information stored in the memory is prevented from being read out.

In this case, it is conceivable that the pairing is unable to be performed as a result of the processing in the step S21. For example, it is conceivable that a person who has attached the skimming device 50 is near the card reader 1 and communication is established between an apparatus possessed by the person and the communication module 53 of the skimming device 50.

Also in this case, it is unlikely that the person stays near the card reader 1 for a long time. Therefore, in such a case, it is preferable that the processing of the step S21 is repeatedly performed. According to this structure, pairing can succeed at a time when the person who has attached the skimming device 50 leaves from the card reader 1. As a result, information can be prevented from being read out by the skimming device 50 and the security can be enhanced.

Alternatively, it may be structured that, when pairing fails, an interfering radio wave by which communication between the communication module 53 of the skimming device 50 and another apparatus can be disconnected is generated to prevent reading of the information.

Alternatively, when pairing fails, it is preferable to notify to the host apparatus 3 that a person who has attached the skimming device 50 is near. According to this structure, a manager of the host apparatus 3 patrols near the card reader 1 to keep the person away from the card reader 1. As a result, pairing is capable of succeeding.

In accordance with at least an embodiment of the present invention, the processing of the step S21 shown in FIG. 10 may be performed after the step S5 of the flow chart shown in FIG. 8.

In the card readers 1 described in the embodiment, the first modified embodiment and the second modified embodiment, a detection object is a card-shaped skimming device 50 which is inserted into the main body part 6. However, even in a case of a skimming device which is attached outside the main body part 6, specifically, in the vicinity of the insertion port 4, when the skimming device is provided with a wireless communication function, the skimming device is detected as a foreign matter similarly to the embodiments described above. Further, it is conceivable that a skimming device is structured of a card-shaped insertion unit for reading information of a card 2 and a communication unit for receiving information with wireless communication from the insertion unit, and the insertion unit is attached inside the card reader 1 and the communication unit is attached to an outer peripheral face (side face or bottom face) of the card reader 1. Also in this case, according to the card reader 1, the skimming device can be detected as a foreign matter.

The card readers 1 in the embodiment, the first modified embodiment and the second modified embodiment are card readers 1 in which a card is automatically conveyed. However, the present invention may be applied to a manual type card reader in which a card is manually inserted and taken out.

As described above, the following matters are disclosed in the present specification Structure (1)

An information processing device structured to process information of an information recording medium having been inserted inside, comprising a communication part which receives a radio wave of a specific frequency band, and a foreign matter detection part structured to detect that a foreign matter has been attached when a state that an intensity of the radio wave received by the communication part is not less than a threshold value continues for a predetermined time.

For example, in a state that a skimming device having a wireless communication function has been attached to a device, there is high possibility that the skimming device sends a radio wave for transmitting information to an external equipment. In this state, a distance between the skimming device and the information processing device becomes shorter and thus, the intensity of the radio wave received by the communications part is increased. Further, the skimming device is located at a fixed position and thus, a state that the intensity of the radio wave is increased continues for a long time. According to the above-mentioned structure (1), attachment of a foreign matter is detected based on the intensity of a radio wave and a duration time of a state that the intensity is not less than a threshold value and thus, a skimming device having such a wireless communication function can be detected with high probability. As a result, the security performance is enhanced.

Structure (2)

The information processing device described in the above-mentioned structure (1), in which the foreign matter detection part determines whether or not identification information of an apparatus of a transmission source of the radio wave is included in the information included in the radio wave received by the communication part and, only when the foreign matter detection part determines that the identification information is not included in the information, the foreign matter detection part performs processing which determines whether a state that the intensity of the radio wave is not less than the threshold value continues for the predetermined time or not.

According to the above-mentioned structure (2), in a case that identification information is included in the information from an apparatus of a transmission source of the radio wave, the determination can be omitted. It is conceivable that a radio wave of the specific frequency band is sent from an electronic apparatus possessed by a user who utilizes the information processing device. However, in a case of such an electronic apparatus, its identification information can be acquired. On the other hand, in a case of a skimming device, there is high possibility that its identification information cannot be acquired. Therefore, when the determination is performed only in a case that identification information is not included in the information received from an apparatus, a processing load can be reduced.

Structure (3)

The information processing device described in the above-mentioned structure (1) or (2), in which the communication part performs communication with an external equipment conforming to a standard for performing one-to-one wireless communication, and the information processing device further includes a pairing processing part which performs pairing processing with a transmission source of the radio wave through the communication part in a case that the foreign matter having been attached is detected.

According to the above-mentioned structure (3), for example, in a case that it is detected that a skimming device has been attached, pairing can be performed with the skimming device. Therefore, communication between a skimming device and another apparatus other than the information processing device cannot be performed. As a result, reading of information through a skimming device by a person who has attached the skimming device can be prevented and security performance can be enhanced.

Structure (4)

The information processing device described in one of the above-mentioned structures (1) through (3), the information processing device further comprising a coping processing part which performs at least one of notification to an external device and reception stop of an information recording medium when the foreign matter having been attached is detected.

According to the above-mentioned structure (4), a fraudulent act utilizing a skimming device can be prevented effectively.

Method (5)

A foreign matter detection method in an information processing device structured to process information of an information recording medium having been inserted inside, the foreign matter detection method comprising receiving a radio wave of a specific frequency band and, when a state that an intensity of the radio wave is not less than a threshold value continues for a predetermined time, detecting that a foreign matter other than the information recording medium has been attached to the information processing device.

According to the above-mentioned method (5), a foreign matter such as a skimming device can be detected with a high degree of accuracy to effectively prevent a fraudulent act utilizing the skimming device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information processing device structured to perform processing of at least one of reading and recording of information recorded in an information recording medium having been inserted through an insertion port into an inside of the information processing device, the information processing device comprising:

a control part which controls the processing of the information processing device; and a communication module which is disposed in the inside of the information processing device and is connected with the control part, the communication module performing wireless communication by using a radio wave of a specific frequency band and receiving the radio wave, and wherein the control part comprises a foreign matter detector which detects that a foreign matter has been attached in the inside of the information processing device, and wherein the foreign matter detector monitors the radio wave received by the communication module in the inside of the information processing device and determines that the foreign matter has been attached when a state that an intensity of the radio wave received by the communication module is greater than or equal to a threshold value has continued during a predetermined time, wherein the foreign matter detector determines whether or not identification information of an apparatus of a transmission source of the radio wave is included in information included in the radio wave received by the communication module, and the foreign matter detector, only in a case that the foreign matter detector determines that the identification information is not included in the information, performs processing which determines whether or not the state that the intensity of the radio wave is greater than or equal to the threshold value has continued during the predetermined time.

2. The information processing device according to claim 1, wherein the communication module performs communication with an external equipment conforming to a standard for performing one-to-one wireless communication, and the information processing device further comprises a pairing processor which performs pairing processing with a transmission source of the radio wave through the communication module in a case that the foreign matter having been attached is detected.

3. The information processing device according to claim 2, further comprising a coping processor which performs at least one of notification to an external device and reception stop of an information recording medium when the foreign matter having been attached is detected.

4. The information processing device according to claim 1, further comprising a coping processor which performs at least one of notification to an external device and reception stop of an information recording medium when the foreign matter having been attached is detected.

5. A foreign matter detection method in an information processing device structured to perform processing of at least one of reading and recording of information recorded in an information recording medium having been inserted through an insertion port into an inside of the information processing device, the foreign matter detection method comprising:

controlling the processing of the information processing device; and performing wireless communication by using a radio wave of a specific frequency band and receiving the radio wave, wherein the foreign matter detection method further comprises:

detecting that a foreign matter has been attached in the inside of the information processing device, monitoring the radio wave received in the inside of the information processing device and determining that the foreign matter has been attached when a state that an intensity of the received radio wave is greater than or equal to a threshold value has continued during a predetermined time, determining whether or not identification information of an apparatus of a transmission source of the radio wave is included in information included in the radio wave received in the inside of the information processing device, and only in a case when it is determined that the identification information is not included in the information, performing processing which determines whether or not the state that the intensity of the radio wave is greater than or equal to the threshold value has continued during the predetermined time.

6. An information processing device structured to perform processing of at least one of reading and recording of information recorded in an information recording medium having been inserted through an insertion port into an inside of the information processing device, the information processing device comprising:

a control part which controls the processing of the information processing device; and a communication module which is disposed in the inside of the information processing device and is connected with the control part, the communication module performing wireless communication by using a radio wave of a specific frequency band and receiving the radio wave, and wherein the control part comprises a foreign matter detector which detects that a foreign matter has been attached in the inside of the information processing device, and wherein the foreign matter detector monitors the radio wave received by the communication module in the inside of the information processing device and determines that the foreign matter has been attached when a state that an intensity of the radio wave received by the communication module is greater than or equal to a threshold value has continued during a predetermined time, wherein the communication module performs communication with an external equipment conforming to a standard for performing one-to-one wireless communication, and the information processing device further comprises a pairing processor which performs pairing processing with a transmission source of the radio wave through the communication module in a case that the foreign matter having been attached is detected.

7. The information processing device according to claim 6, further comprising a coping processor which performs at least one of notification to an external device and reception stop of an information recording medium when the foreign matter having been attached is detected.

* * * * *